United States Patent

[11] 3,609,596

[72] Inventor Frederic R. Morgenthaler
Winchester, Mass.
[21] Appl. No. 740,751
[22] Filed June 27, 1968
[45] Patented Sept. 28, 1971
[73] Assignee Massachusetts Institute of Technology
Cambridge, Mass.

[54] APPARATUS FOR PROVIDING TIME-DELAY FREQUENCY SELECTIVITY AND/OR SWITCHING OF WAVE ENERGY
9 Claims, 12 Drawing Figs.

[52] U.S. Cl. .......... 333/7, 324/43 R, 333/6, 333/18, 333/31 R, 333/31 A, 333/73 R
[51] Int. Cl. .......... H01p 5/12
[50] Field of Search .......... 333/7, 18, 24 G, 24.1, 31, 31 A, 73, 73 W; 324/43, 47; 340/174 CT; 330/4.8, 5

[56] References Cited
UNITED STATES PATENTS

| | | | |
|---|---|---|---|
| 3,445,774 | 5/1969 | Sparks et al. | 333/30 |
| 3,016,495 | 1/1962 | Tien | 330/4.8 |
| 3,304,520 | 2/1967 | Auld | 333/7 |
| 3,379,985 | 4/1968 | Matsuno | 330/4.8 |

OTHER REFERENCES
Schlomann et al., " Proc. IEEE," Oct. 1965, pp. 1495–1507, (pp. 1495– 1496 relied on).

*Primary Examiner*—Roy Lake
*Assistant Examiner*—Darwin R. Hostetter
*Attorneys*—Thomas Cooch, Martin M. Santa and Robert Shaw

ABSTRACT: Apparatus for providing time delay, frequency selectivity and/or switching of electromagnetic wave energy, that includes, a single- or multilayer magnetic material adapted, when magnetized, to convert electromagnetic wave energy in air, for example, to spin wave energy in the material, the electromagnetic wave energy being subjected to an abrupt discontinuity in the equilibrium environmental parameters to effect such conversion. The electromagnetic wave is converted within the material to a combination of evanescent and propagating spin waves. By controlling the abruptness of said discontinuity, it is possible, as discussed herein, to control the rate of decay ($\alpha$) of the evanescent wave and the wave number ($k$) of the spin wave thereby to control the rate of conversion and determine, further, the wavenumber of the spin wave. It has been found, for present purposes, that when $\alpha = k$, the group velocity of the spin wave is minimum, thus making possible the use of thin films to provide substantial delay.

There is also described apparatus and method in which the power within the material can be directed at some angle to the direction of the incoming wave to provide some time delay but, more importantly, to provide switching and/or filtration of an input signal; the latter apparatus and method do not ordinarily relate to thin film although thin film may be used. Further, operation is generally in the region of $\alpha >> k$.

INVENTOR
FREDERIC R. MORGENTHALER
BY
ATTORNEY

INVENTOR:
FREDERIC R. MORGENTHALER
BY Robert Sloan
ATTORNEY

INVENTOR:
FREDERIC R. MORGENTHALER
BY Robert Shaw
ATTORNEY

APPARATUS FOR PROVIDING TIME-DELAY FREQUENCY SELECTIVITY AND/OR SWITCHING OF WAVE ENERGY

The invention herein described was made in the course of contracts with the Office of the Secretary of Defense, Advanced Research Projects Agency, and Air Force Cambridge Research Laboratories, Office of Aerospace Research.

In an application for Letters Patent entitled, "Method of and Apparatus for Changing Frequency, Power and/or Delay Time of Wave Energy," Ser. No. 645,947, filed June 14, 1967 by the present invention, now U.S. Pat. No. 3,530,302, granted Sept. 22, 1970, there is described apparatus and method for converting electromagnetic wave energy to propagating spin wave and/or elastic wave energy and vice versa. It is noted therein that under appropriate circumstances the conversion from one to the other form of energy can be made and the angular frequency ($\omega$) and wave number ($k$) of certain propagating wave energy can be changed by changing the environmental parameters within the material. In an article entitled, "Photon/Magnon Conversion Near A Material Interface," in Electronics Letters, July 1967, Vol. 3, No. 7, pp. 299–302, the present inventor discusses delay means whereby substantial time delay of wave energy is obtained even in thin film materials and in a relatively nondispersive fashion. Thus, it has been found that under appropriate circumstances an electromagnetic wave propagating in air may be presented, for example, to a magnetic material and can be converted to evanescent wave energy and propagating spin wave energy within the material. Whereas the spin wave propagates within the material, the evanescent wave is stationary and degenerates asymptotically spatially, there being an interchange of energy between the evanescent wave and the propagating wave which results in evanescent wave energy being transferred to the propagating spin wave and vice versa.

The apparatus hereinafter described is adapted to provide time delay of electromagnetic wave energy; but, in addition, it provides filtration and/or switching as well. It has been found, moreover, for present purposes, that although there can be no conversion at the interface boundary from electromagnetic power transfer in air to quantum mechanical exchange power transfer by the propagating spin wave in the material, nevertheless, under certain conditions, conversion can occur near the boundary. Conversion from conventional electromagnetic wave energy to spin wave energy, as noted in said application, may be effected by presenting a graded internal magnetic bias field to the electromagnetic wave or by adjusting the level of the bias field to one at which conversion can take place. In the present case a delay material is chosen that is adapted to present an abrupt discontinuity to the electromagnetic wave energy, thereby to provide photon-to-magnon conversion very near the material interface, the level of the external magnetic bias field being adjusted to an appropriate level to effect such conversion. The direction of propagation of the spin wave and the direction along which the evanescent wave degenerates is determined, as hereinafter discussed in greater detail, by the direction of the incoming wave into the magnetic material and the direction and magnitude of the internal DC magnetic bias field. It is also possible, using the principles taught herein, to control the direction of spin wave power flow in the material and to change that direction very quickly by, for example, small changes in the DC bias field. Accordingly, a principal object of the present invention is to provide apparatus and method adapted to switch a microwave electromagnetic signal from, For example, one output to another in microseconds by providing magnetic apparatus that is very sensitive to changes in the direction and magnitude of an internal DC magnetic field, provision being made for changing the magnitude and/or direction of the field.

It has been found that if the wave number of the spin wave at conversion is at a value herein designated $k_x$ in the $\omega$–$k$ diagram, there is a maximum transfer from evanescent wave energy to spin wave energy, and, at that value, approximately 50 percent of the spin wave power is carried in each of the electromagnetic channels and the quantum mechanical exchange channels. Also, $k_x$ represents the value at which the group velocity of the propagating spin wave, in the absence of transverse boundaries, is minimum so that delay is maximized and at which dispersion is also minimum so that the integrity of the input wave is maintained. Therefore, the delay material is chosen, and the external magnetic bias is adjusted to provide an appropriate environment to effect conversion near the interface at values of wave number $k$ which result in the desired delay and allowable dispersion for the particular application. Hence, another object of the present invention is to provide a method of and apparatus for providing substantial time delay of electromagnetic wave energy while nevertheless preserving substantially the wave shape of the input energy.

A further object is to provide such substantial time delay even in a thin film material.

Another object is to provide a delay means for electromagnetic wave energy in which the energy is subjected to one or more abrupt discontinuities by providing a magnetic material consisting of one or more layers or regions to provide the discontinuities.

In delay apparatus for which the present invention is adapted, it is important not only that an appreciable delay time be provided in a small volume; but it is also of importance that the delay time, once established, be substantially constant. Since, in equipment, the environmental parameters presented to the wave energy will change due, for example, to temperature changes, electric current fluctuation to the coils that provide the external bias field, and the like, it is to be expected that changes in delay time of the wave energy will occur; accordingly, an additional object of the present invention is to provide ways for reducing the effect upon delay time of uncontrollable changes in the equipment.

A still further object is to provide apparatus in which the time delay of the wave energy is related to the magnetic field thereby to give an indication of the magnitude of the magnetic field.

Another object is to provide apparatus adapted to remove or filter undesirable frequencies of the wave energy.

Other and further objects will become evident in the specification to follow and will be more particularly pointed out in the appended claims.

The objects of the invention are attained, broadly, by a method that comprises, introducing electromagnetic wave energy to a material that will support propagating spin wave energy and evanescent wave energy and allow interchange of energy therebetween, the material being one in which the electromagnetic wave energy can be converted to evanescent wave energy and propagating spin wave energy and in which the group velocity of the propagating wave and the rate of decay of the evanescent wave can be varied by varying the environmental parameters within the material. The material parameters are such that, when subjected to an appropriate applied magnetic field, an abrupt discontinuity is encountered by the electromagnetic wave thereby to effect the conversion of the wave energy from electromagnetic power to a combination of evanescent and spin wave, the spin wave power being carried in the electromagnetic channel, the quantum mechanical exchange channel or a combination thereof.

The invention will now be explained in connection with the accompanying drawings in which.

Figure 5:
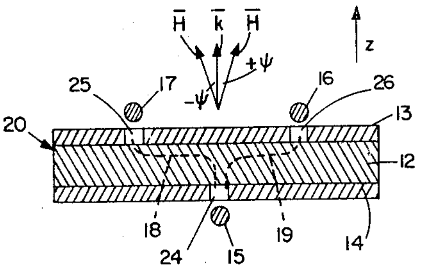
FIG. 5 is a cross-sectional view of a magnetic material adapted to perform the functions herein disclosed.
Figure 6:
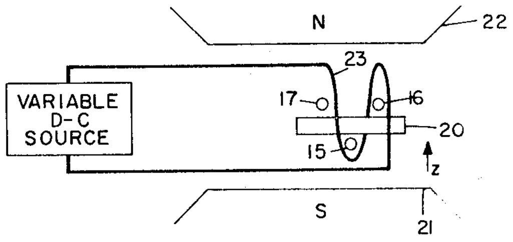
FIG. 6 shows the material of FIG. 5 in reduced size and also, schematically, shows means for providing a $z$-directed internal DC magnetic field with further means for rotating the field through angles $=\psi$ and $-\psi$ to the $z$-direction.

Turning now to the drawings, apparatus is shown generally at 20 in FIGS. 5 and 6 for providing time delay, frequency selectivity and switching of electromagnetic wave energy. The apparatus comprises a magnetic material 12 (which may be a single crystal doped yttrium iron garnet [YIG]) in the disclosed embodiment with a first nonmagnetic metal reflection wall 14 (which may be a thin film of silver, aluminum, gold or the like) secured to one face thereof and a second metal reflection wall 13 secured to the other face. An input aperture or window 24 admits electromagnetic energy to one region of the magnetic material 12 and output apertures or windows 25 and 26 allow the energy to be withdrawn from the material at another region thereof. Output apertures other than 25 and 26 may be provided, and the relative lateral positions of 24, 25 and 26 may be changed, the wave energy being directed to one or the other of the windows in a manner explained hereinafter. The material is one that will support propagating spin wave energy and evanescent wave energy; and is, further, one in which the electromagnetic wave energy can be converted to evanescent and spin wave energy and which allows interchange of energy between the evanescent wave and the spin wave. In addition, the group velocity ($V_g$) (the path of travel of power in the spin wave, as represented by either of dotted lines 18 and 19 in FIG. 5, is the same direction as the group velocity vector) of the spin wave and the rate of decay ($\alpha$) of the evanescent wave can be varied by varying the environmental parameters within said material. A suitably doped yttrium iron garnet crystal serves the foregoing purposes. The material parameters of YIG can be varied by different types and amounts of dopant (See an article entitled, "Magnetic Effects of Indium and Gallium Substitutions in yttrium Iron Garnet," Anderson et al. Journal of the Physical Society of Japan, Vol. 17, Supplement B–1, Proceedings of the Conference on Magnetism and Crystallography, Sept. 1961), and the material parameters in combination with an external applied DC magnetic field compose the environmental parameters (i.e., the internal DC magnetic bias field) encountered by the wave energy within the material. The value of the magnetic field and the magnetic characteristics of the particular material used are chosen to provide at least one abrupt discontinuity in the equilibrium environmental parameters to effect the conversion from electromagnetic power to a combination of evanescent and propagating spin waves, the spin wave power being carried in the electromagnetic channel, the quantum mechanical exchange channel or a combination thereof.

Figure 4B:
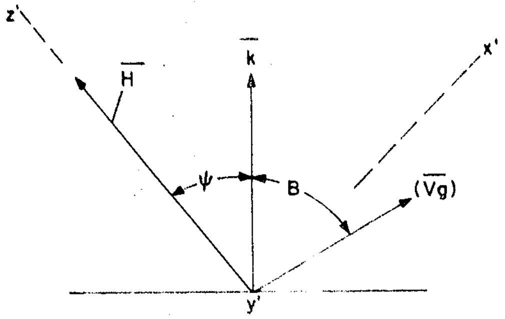
FIG. 4B shows the vector relationship between the wave vector $\bar{k}$ and the group velocity vector ($\bar{V}_g$), when there is some angle $\psi$ between $\bar{k}$ and an internal magnetic field designated $\bar{H}$, and cartesian coordinates X', y', z' are also shown.
Figure 4A:
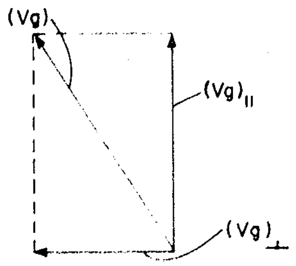
FIG. 4A is a vector diagram to show the group velocity ($V_g$) of a spin wave as a vector sum of the parallel component $(V_g)_{||}$ and the perpendicular component $(V_g)_{\perp}$ ·

It is in order now to discuss the theory of the concepts herein disclosed. The discussion in the Morgenthaler article relates to the special case of a positively circularly polarized electromagnetic wave in air at normal incidence to the interface boundary between air and a lossless material, as a lossless material 12. In the special case the angles $\psi$ and $\beta$ discussed below both equal zero. The discussion to follow, however, relates to the general case where $\psi$ and $\beta$ need not equal zero and, in fact, cannot equal zero if steering of the propagating spin wave is to be effected. The angle $\beta$, as shown in FIG. 4B, is the angle between the $\bar{k}$ vector of a spin wave and the group velocity vector designated ($\bar{V}_g$) when the internal bias field $H_z$ is at some angle $\psi$ to the $\bar{k}$ vector. A number of expressions may be used to define the angle $\beta$, as discussed later, one such expression being the following:

$$\tan\beta \approx \frac{1}{2+\frac{\omega_M \sin^2\psi}{\omega_z+\lambda k^2\omega_M}}\cdot\frac{\sin^2\psi}{2\lambda k^2} \qquad (1)$$

where $k$ is the wave number of the propagating spin wave; $\lambda$ is the exchange constant (approximately $3\times10^{1}12$ cm$^2$ for YIG); $\omega_M$ is a constant ($\approx\pi\times10^{10}$ rad./sec. for YIG);$\omega_z=|\gamma|\mu_o H_z$, where $\gamma$ is the hydromagnetic ratio and $\mu_o$ is the permeability of free space ($\omega_z\approx2\pi\times2.8\times10^6\times H_z$(oe.) rad./sec. for YIG); $k_o=\omega/c$times the square root of the dielectric constant , where $c$ is the velocity of light and equals $3\times10^{10}$ cm./sec. and $\omega$ $\omega_z$. The expression shown at (1) does not include magnetic anisotropy and is valid if $\lambda k^2>>k_o^2/k^2$. The following expression is valid if $\psi<<1$ and $k^{**}>k_o$:

$$\tan\beta \simeq \frac{\psi}{2\left(\lambda k^2+\frac{k_o^2}{k^2}\right)} \qquad (2)$$

The expression (2) includes higher order corrections to the magnetostatic approximation and, again, does not include magnetic anisotropy. The exact expression for tan $\beta$ the property that as $k\rightarrow k_o$, $\rightarrow o$ independent of $\psi$.

The following analysis—expressions (3) through (9)—is carried out in the magnetostatic approximation, is valid when magnetic anisotropy is present and approaches the exact solution for large values of $k$, i.e., $k>>k_o$:

$$\langle\bar{e}_1\times\bar{h}_o\rangle=\frac{\omega\mu_o a^2\sin2\psi}{4k^2}\cdot(\bar{i}'_y\times\bar{k}) \qquad (3)$$

$$\bar{m}_o=\bar{i}'_x a\cos(\omega t-\bar{k}\cdot\bar{r})+\bar{i}'_y b\sin(\omega t-\bar{k}\cdot\bar{r}) \qquad (4)$$

$$\left\langle-\mu_o\lambda\frac{\partial\bar{m}_o}{\partial\bar{r}}\cdot\frac{\partial\bar{m}_o}{\partial t}\right\rangle=\mu_o\lambda\omega\bar{k}\frac{a^2+b^2}{2} \qquad (5)$$

$$\langle W\rangle=\tfrac{1}{2}\mu_o\frac{ab}{\omega_M}\omega \qquad (6)$$

$$\langle\bar{s}\rangle=\langle\bar{e}_1\times\bar{h}_o\rangle+\left\langle-\mu_o\lambda\frac{\partial\bar{m}_o}{\partial\bar{r}}\cdot\frac{\partial\bar{m}_o}{\partial t}\right\rangle=\langle W\rangle\bar{V}_g \qquad (7)$$

$$(\bar{V}_g)=(\bar{V}_g)_{||}+(\bar{V}_g)_{\perp}=\frac{a^2+b^2}{ab}\lambda\omega_M\bar{k}+\frac{a}{b}\,\frac{\sin2\psi}{2}\,\frac{\omega_M}{k^2}(\bar{i}'_y\times\bar{k}) \qquad (8)$$

$$\tan\beta=\frac{(\bar{V})_{\perp}}{(\bar{V})_{||}}=\frac{a^2}{a^2+b^2}\,\frac{\sin2\psi}{2\lambda k^2} \qquad (9)$$

where $<\bar{e}_1\times\bar{h}_o>$ is the time-averaged electromagnetic power flux (watts/m.$^s$), $\bar{e}_1$ is the electric field (volts/m.), $\bar{h}_o$ is the magnetic field (amperes/m.), $a$ and $b$ are the amplitudes of the small signal (s.s.) magnetization vector $m_o$ (amperes/m.) ($a=b$ in a circularly polarized wave and $a\neq b$ in an elliptically polarized wave), $\bar{i}_x'$ and $\bar{i}_y'$ are unit vectors in cartesian coordinates, $\bar{r}'=\bar{i}_x'+i_y'y'+i'_z z'$, $t$ is time (seconds), $$\left\langle-\mu_o\lambda\frac{\partial\bar{m}}{\partial\bar{r}}\cdot\frac{\partial\bar{m}}{\partial t}\right\rangle$$

is the quantum mechanical exchange power flux (watts/m.$^2$), $<W>$ is the time-averaged energy density of the wave (joules/m.$^3$), $\omega_M$ is$|\gamma|\mu_o,M_s$, $M_s$ is the saturation magnetization (amperes/m.), <s> total time average power flux (watts/m.²), and $(V_g)||$ and $(V_g)\perp$ are respectively the components of $(\overline{V_g})$ parallel and perpendicular to the $k$ vector. From the foregoing expressions it can be seen that the path (18 or 19, for example, in FIG. 5) taken by the propagating spin wave within the material 12 can be changed in a number of ways. It is possible to perform a switching function by, for example, tilting the $H$ field from $+\psi$ to $-\psi$ in FIGS. 5 and 6 to switch the output from the window 26 to the window 25 (a $z$-directed field in FIG. 6 can be provided by poles 21 and 22 and changes from $+\psi$ to $-\psi$ can be effected by the coil shown schematically at 23), or the external bias field can be changed in magnitude to effect changes in $\beta$. Furthermore, as will be explained more fully hereinafter, the delay time of the wave energy within the material 12 can be varied by changing the internal bias $H$ in magnitude and/or direction, and the frequencies that will reach the ports 25 and 26 along paths 18 and 19, respectively, can be effected in like manner to accomplish a filtering function. However, before any work can be performed upon a spin wave, a spin wave must be created. The more general explanation of conversion from electromagnetic power to spin wave power contained in said application is summarized below and amplified in some particulars. The circuit arrangement to provide the results discussed can be that shown in FIG. 7, where a magnetic material 60 is shown disposed within a waveguide 65.

Figure 1:
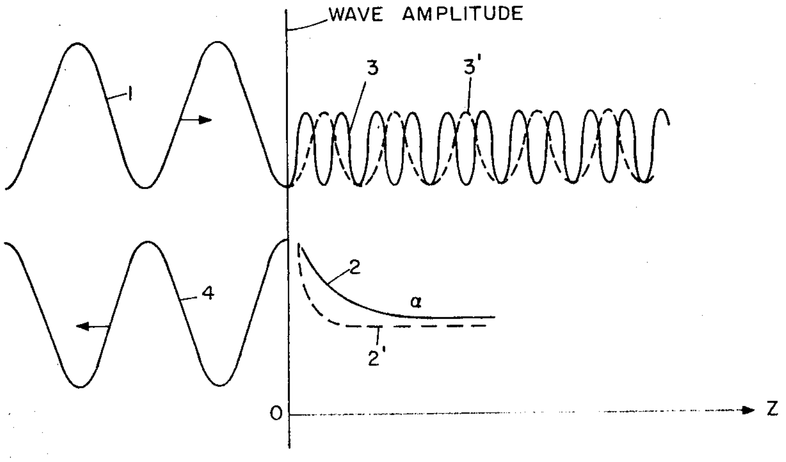
FIG. 1 is a sketch representing a wave amplitude profile showing input and reflected electromagnetic wave energy at an air material interface of a magnetic material and evanescent and spin wave energy within the material.

A profile representation of the wave energy previously discussed may be that shown in FIG. 1, where 1 represents incoming electromagnetic wave energy traveling in air, which enters a material and converts to evanescent wave energy (the decay rate of which is represented by the curve shown at 2), and propagating spin wave energy (represented by the sinusoid shown at 3). (In FIG. 1, at the air side of the interface, in addition to the incoming wave 1, there is shown a similar but oppositely directed wave 4 to represent reflected electromagnetic energy).

The ordinate in FIG. 1 can be taken as an interface representing, for example, air to the left and some magnetic material 60, as yttrium iron garnet or other material to the right. It is pointed out in the Morgenthaler article that when the wave number $k$ of the spin wave during conversion is equal to some value $k_x$ in FIG. 2 ($n=k/k_x$32 1), the group velocity of the spin wave is minimum, resulting in greatest delay time in the material; and, also, dispersion is minimum. Moreover, at $k_x$ the curves $\omega$–$k$ and $\omega$–$\alpha$ coincide.

Figure 2:
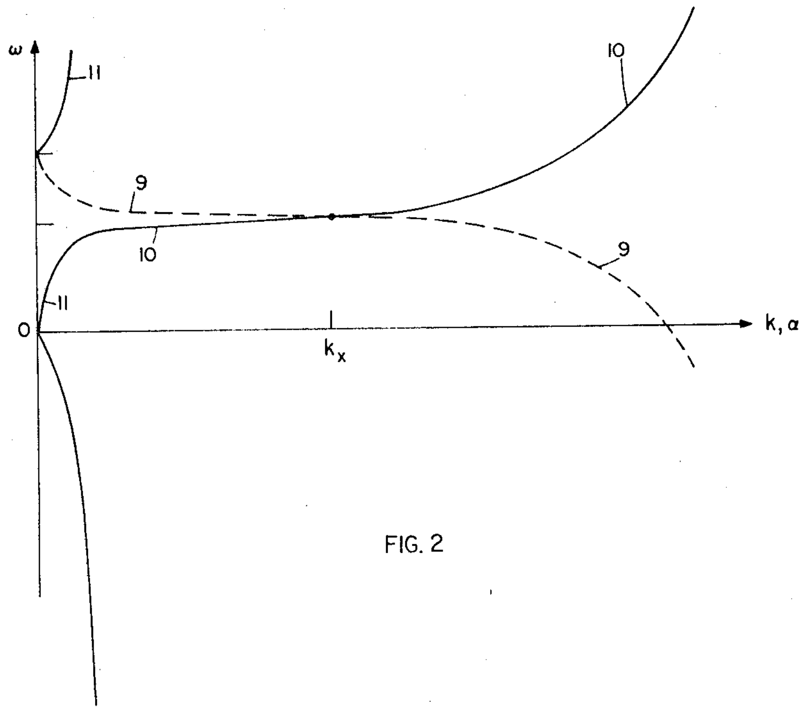
FIG. 2 is a sketch representing the intrinsic relationship between angular frequency ($\omega$) and wave number ($k$) of the spin wave and decay rate ($\alpha$) of the evanescent wave in the material in the absence of transverse boundaries and for the special case in which the angle $\psi$ defined below equals zero and the wave energy is circularly polarized.

Some of the electromagnetic energy represented by the curve 1, upon entering the delay material, proceeds axially (in the $z$-direction) within the material and through. This represents a small amount of the input energy, and it passes along out of the material, with some delay time. It is propagating wave energy and may be termed a precursor because it serves the useful function of preceding the energy to come behind and begins the establishment of the evanescent wave. At or near the interface an evanescent wave forms which decays in magnitude, as represented by the curve 2. The rate of decay $\alpha$ can be modified, for example, by changing the internal magnetic bias $H$, to the value shown, for example, at 2'; the particular condition depicted by 2' results from an increase in the internal magnetic bias field $H$. (The change in $H$ may be effected by changing the strength of the external field or by providing appropriate material gradations by doping the YIG material, as discussed in the Anderson et al. article.) In FIG. 2 the $\omega$–$k$ curves shown at 10 and 11, representing spin waves and electromagnetic waves, respectively, and the $\omega$–$\alpha$ curve shown at 9 of the evanescent wave will all shift upward as a result of the increase in $H$, and $k_x$ would shift to the right of the position shown, the shift reflecting the increase in decay rate $\alpha$, represented by the curve 2', and the increase in wave number $k$, represented by the dotted curve shown at 3'. An appropriate value of external magnetic bias can be applied, therefore, to give the desired point of conversion from photon-to-magnon to fit a particular requirement.

A more complete explanation of the method of power transfer in the spin wave will now be made. The discussion is restricted to a situation wherein a circularly polarized electromagnetic wave in air is introduced to a delay material at the air-to-material interface and the wave, upon striking the face, does so along a line that is orthogonal to said face; i.e., the direction of propagation is axial ($z$-directed in FIG. 7) and the faces of the delay material, as the material 60, are perpendicular to said direction. Furthermore, a $z$-directed external DC magnetic bias field of sufficient magnitude to saturate the material is used. In such a circumstance the group velocity of the spin wave ($V_g$) is equal to the parallel component $(V_g)||$ thereof, but $(V_g)$ does not equal $(V_g)||$ except in this special case.

Figure 3:
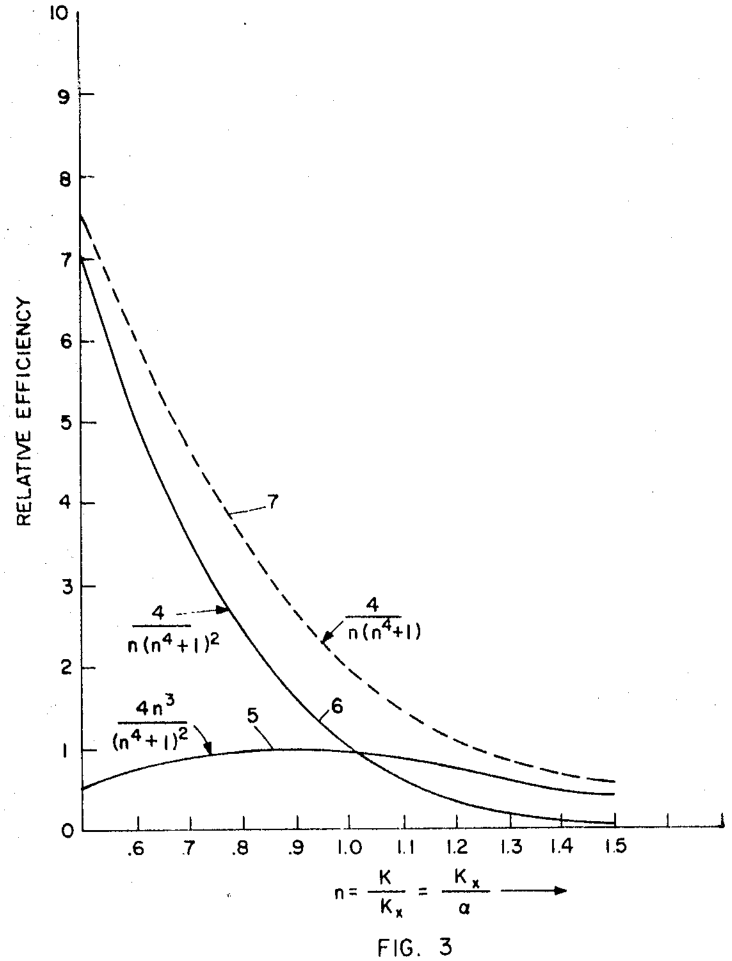
FIG. 3 is a graph of the relative conversion efficiency of power from electromagnetic wave energy in air to electromagnetic spin wave energy and exchange spin wave energy in the magnetic material as a function of $n$, where $n=k/k_x=k_x/\alpha$ and where $k_x$ is a point on the $\omega$–k and $\omega$–$\alpha$ curves in FIG. 2 at which $k=\alpha$.

Spin waves refer to energy waves appearing in a material by virtue of precessional movement of electrons about a magnetic axis. Energy can be pumped into the spin wave or removed therefrom. The dipoles formed by the precessional movement pass energy to adjacent dipoles by quantum mechanical exchange means or by electromagnetic means. Either way, however, the frequency of the wave bears a one-to-one relationship with the precessional movement of the dipoles, and, indeed, there is at all times some electromagnetic power transfer mixed with some exchange power transfer within the spin wave. Since electromagnetic power tends to travel fast, at the speed of light in air but at reduced speed in magnetic materials, and the exchange power travels relatively very much slower, the speed at which power transfer takes place within the material depends upon the relative mixture of the forms of power appearing in the spin wave. At values of $n<1$, the conversion of power to the electromagnetic spin wave channel, as shown by the curve shown at 6 in FIG. 3, is much greater than the conversion to the quantum mechanical exchange channel of the spin wave, as represented by the curve shown at 5. (The combined efficiency is represented by the curve shown at 7.) The parallel component as a function of $n$ is $$(V_g)||\sim\frac{n^4+1}{2n^3}$$

and rises dramatically for values of $n<1$. (The perpendicular component, though not being considered at this juncture, is also a function of $n$, in the magnetostatic approximation, bearing the relationship $(V_g)\sim 1/n$.) Thus the values of $k$ and $\alpha$ at which conversion takes place to spin wave determines the ratio of power being carried in the electromagnetic channel and the quantum mechanical exchange channel in the resultant propagating wave at that point and the group velocity of the spin wave.

The explanation in the previous paragraph, as mentioned, was made on the basis that the incident electromagnetic wave is positively circularly polarized and introduced to a ferromagnetic or other appropriate material, having a pair of flat parallel faces, along a direction of propagation perpendicular to said faces, i.e., in the $z$-direction,. In addition, the internal magnetic bias $H$ in the material in parallel to the direction of propagation, and the material is magnetized to saturation. If, however, the incident wave is not so directed or if the magnetic bias is directed in some direction other than $z$, than $\psi$ will change and according to expressions (2) and (9) can vary radically from the previous value. For example, for $k_o$=1cm.⁻¹, $k$=50 cm.⁻¹, $$\lambda k^2<<\frac{k_o^2}{k^2}$$

and the expression (2) becomes; tan $\beta \approx 1{,}250\ \psi$. where $\psi$ is in radians. A change of $\psi$ from zero to 1° will alter $\beta$ from 0 to approximately 87°. Also, for any given material at a given magnetic bias, the spatial conversion from electromagnetic power can be altered by varying the angle of incidence to some other value, and in such circumstances $k$ and $\alpha$ respectively of the propagating and evanescent spin waves will change from the particular value obtained using the $z$-directed wave. It should be noted, however, that when the angle of incidence and/or DC field direction are altered, the simple conditions discussed in the Morgenthaler article do not apply; in particular, spin waves having both an $\overline{\alpha}$ and $\overline{k}$ (even in the lossless case) can occur under some conditions and be excited at the interface. Such surface waves have the property that power is guided along or at an angle to the surface and, like the simpler waves, can provide useful functions, such as delay, switching and/or filtering. The effect on power flow due to departures from the special case can be seen upon reference to the mathematical expressions previously presented.

Thus, a switch for microwave electromagnetic energy can be made using the principles herein disclosed, and such a switch is capable of effecting switching from one output to another, as outputs 25 and 26 in FIG. 5, very quickly (of the order of microseconds) with milliwatts of power required to effect such switching. The input electromagnetic energy can be introduced to the single crystal YIG material 12 at the input port 24 through a conductor 15 and removed through either of output conductors 16 and 17 at output ports 26 and 25, respectively, switching the path of power traveled within the material 12 being effected by changing the direction of $\overline{H}$ from $+\psi$ to $-\psi$, as before discussed. An ambient magnetic field between the pole piece 21 and 22 of an electromagnet is provided at a level to establish a magnitude of internal bias $H$ at which conversion from electromagnetic power transfer to spin wave power transfer can occur, as previously mentioned. The level of $H$ thereby established is such that the wave number $k$ of the propagating spin wave is substantially greater than $k$ to enable the low-power, short-time switching just mentioned. For, as before discussed, as $k \rightarrow k_o$, $\beta \rightarrow o$, independent of $\psi$, so that the switching apparatus herein disclosed cannot be used at very low $k$ values, i.e., much below about $5k_o$.

The discussion in the previous paragraph relates to the switch function of the present invention which may also serve as a computer memory element. It will be noted, however, that wave energy at different frequencies will be converted to spin waves having different $k/k_o$ ratios; therefore, according to expressions (2) and (9) the angle $\beta$ is a function of frequency. Thus, with reference to FIG. 5, energy entering at the port 24 may, for example, pass along the path 18 to be removed at the output port 25. However, only a narrow band of frequencies will be removed at 25 because the angle $\beta$ for each narrow band will differ from the angle $\beta$ of each other narrow band.

Figure 7:
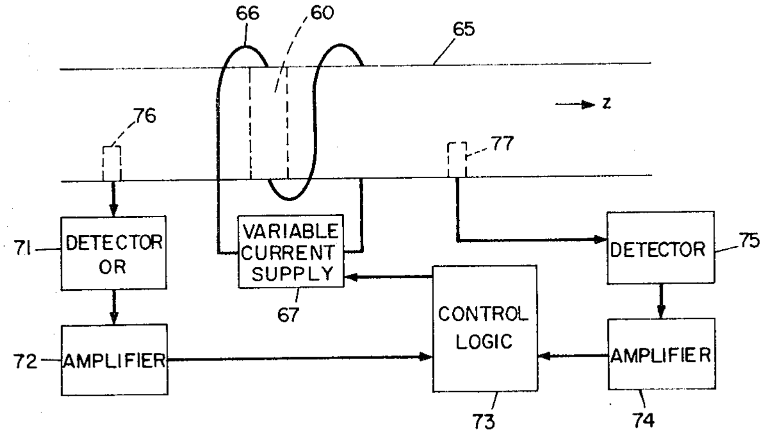
FIG. 7 is a modification of the apparatus of FIG. 5 and shows a magnetic material within a waveguide.

In order to determine and control time delay of electromagnetic energy introduced to pass from left to right in the waveguide 65 in FIG. 7, a probe 76 can be provided within the waveguide to pick up the incoming signal, which may be in the form of a series of pulses, and the time delay effected by the material 60 can be determined by relating the incoming pickup by the probe 76 to an outgoing pickup by a probe 77. The amount of delay can be modified by feeding the signals from the two probes to a variable DC current supply 67 thereby to modify the current in the coil 66 to render changes in $H$, as before discussed. The signals from the probes 76 and 77 are passed through detectors 71 and 75, respectively; and the detected signals are then amplified by amplifiers 72 and 74, the outputs of which are fed to a control logic device 73 and thence to the current source 67.

Figure 8:
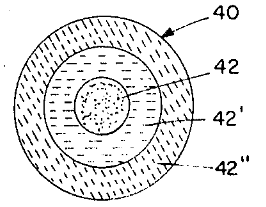
FIGS. 8, 9, 10 and 11 show some variations of the magnetic material shown in FIG. 7.
Figure 9:
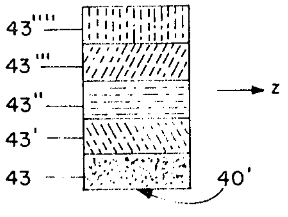
Figure 10:
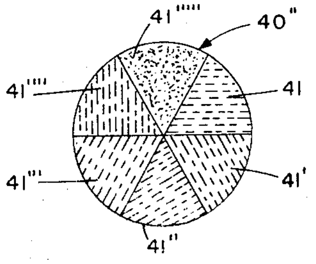
Figure 11:
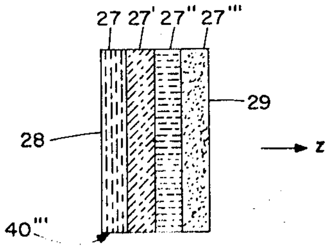

It is possible, therefore, by using a suitable magnetic material and appropriate bias, to achieve a condition where conversion can take place. Thus, a YIG rod with suitable dopant added can be biased to a value at which conversion can take place; and in the device of the present invention, the level of internal magnetic field is chosen to provide conversion from electromagnetic energy to spin wave energy with no provision for the elastic wave discussed in said application. In order to effect conversion at a desired region in the material, the composite materials shown at 40, 40', 40'' and 40''' of FIGS. 8, 9, 10 and 11, respectively, may be used in the waveguide arrangement of FIG. 7. (The $z$-direction in FIGS. 8 and 10 is out of the paper or into the paper, whereas the $z$ direction in FIGS. 9 and 10, as shown, is to the right). The composite materials are provided by varying the dopant in different regions of the crystal. Thus, for example, radially disposed regions 42, 42' and 42'' of the crystal 40 are doped in such a fashion that at a given applied field the internal magnetic bias of the film 40 will vary from region to region. Similar remarks apply to multitransverse layers 43, 43', etc., of FIG. 9, the wedge-shaped regions 41, 41', etc., of FIG. 10 and the multiaxial layers 27, 27', etc., of 40'''. Thus, a $z$-directed wave incident upon the delay material of FIG. 7 will encounter—if crystals similar to 40, 40' and 40'' are used—a plurality of transversely disposed regions in which the environmental parameters vary from region to region and conversion from electromagnetic energy to propagating spin wave energy will occur in that region wherein the environmental parameters are at an appropriate level for such conversion. Furthermore, the composite crystal 40''' of FIG. 11 can include layers of the type disclosed in FIGS. 8, 9 and 10.

A further benefit may be derived from a magnetic material having graded material parameters. Assume, for example, that the material is graded so that a uniform external $z$-directed magnetic field results in an internal bias $H$ which is maximum at the center of the film and decreases transversely toward the outside edges thereof; that is, with reference to FIG. 8, the region 42 has maximum $z$-directed $H$ values and 42' and 42'' have respectively lesser values of $H$ at one value of uniform applied field. Then electromagnetic energy directed into the material in FIG. 7 is converted in the manner previously discussed and will be withdrawn after a time delay. The length of time delay will depend to a great extent upon the point of conversion within the film. Energy passing through the region 42 will convert at a different point along the path of travel than energy in the region 42', which will, in turn, differ from energy in 42''. If the gradations vary uniformly from the center outward, for example, then there will be dispersion of the energy in the material. However, pulses, for example, will have quite uniform time delay and dispersion, even with changes in the magnitude of internal bias $H$, since the effect of such changes will be merely to shift the region through which wave energy of any particular group velocity will travel; and the resultant output pulse formed from the various group velocities involved will not change appreciably, being effectively a total which will not be effected as a whole to the extent that the individual components thereof are affected. Furthermore, the point of conversion will have an effect on the switching and filtering functions previously discussed.

The external magnetic field provided by the coil 66 should ideally be uniform throughout the region occupied by the magnetic material. However, even if such uniformity exists, the internal bias field $H$ will tend to be lower near the faces thereof, as the faces shown at 28 and 29 in FIG. 11, than within the interior thereof because of demagnetization due to dipole effects. For this reason, it is often desirable to provide a multilayer material as, for example, the multilayer device 40''' in which the dopant and amounts of dopant differ from layer to layer to counteract to some extent the dipole effect and also to provide the abrupt discontinuity as a series of smaller discontinuities. Thus, the material 40''' can be used to provide a particular profile of internal bias $H$ in the $z$-direction and can be used, for example, to overcome to some extent the demagnetizing effect of dipole action. Furthermore, whereas changes in effective internal field strength, effected by changes in the external field or by effectively reducing the distance between field lines, are completely governed by Maxwell's equations, similar changes effected by modifying the dopant are not so governed, insofar as the magnetic anisotropy is involved. Even without anisotropy, a field produced by a magnetization vector with nonzero divergence is not a Laplacian field; the latter is often not the most appropriate type of field. The outer layers 27 and 27''' may, for present purposes, be doped with larger amounts of, say, gallium than the inner layers 27' and 27'', the larger amounts of gallium being effective to increase $H$ in the layers 27 and 27''' for a given applied field. An appropriate amount of dopant can be provided in each layer, using the teachings in the Anderson et al. article, to give the required profile of the bias field $H$.

The discussion with reference to FIGS. 5 through 11 relates to situations where the magnetic bias field $H$ and the wave energy are generally $z$-directed, the angle $\psi$ being typically less than 1° from the $z$ direction. It can be seen from the mathematical expressions that similar results obtain when the external field is oriented near a direction $\pi/2$ radians from the $z$-directed field previously discussed. However, whereas an applied field of 2,000 gauss, typically will be required to provide a $z$-directed internal field $H$ of about 300 gauss (for example, to convert a 1,000 MHz electromagnetic signal to a spin wave), a 300 gauss external field directed in the plane of the material (in which $\omega_M$ is $\pi\cdot10^{10}$ radians/sec. will result in an internal field $H$ of about 300 gauss. However, to shift the field from $+\psi$ to $-\psi$, for example, requires more power when the field generally is directed in the plane of the material than when the field is directed generally in the $z$ direction. (It should be here noted that the crystals discussed herein may measure typically a few spin wave lengths in the $z$ direction but tens of wavelengths in cross dimensions).

As previously mentioned, when wave energy within the magnetic material is at or near the value $k_x$ (values of $k$ within the range $n=½$ to $n=3$ are considered near $k_x$ for present purposes), appreciable time delay can be obtained. In the absence of loss a theoretical delay time of the order of 2.5 microseconds in $10^{13}$ cm. is possible in YIG, thus rendering the present invention useful, also, in connection with thin film devices.

In the prior discussion it is shown that the group velocity of the propagating wave is quite sensitive to changes in the internal magnetic bias field $H$, which, in turn, is a function of the external field. It is possible, therefore, by noting changes in the group velocity, i.e., time delay, to relate such changes to the changes in the external field thereby to determine the magnitude of any changes in the external field. The circuitry disclosed in FIG. 7 can thus be used to provide a measure of the external field.

References to the wave number $k$ in the present specification relates in all instances to the propagation constant of the spin wave, and the decay rate $\alpha$ relates only to the reactive or evanescent decay; it should be noted, however, that a propagating spin wave in a nonideal material has a decay rate, and the evanescent wave has a wave number. As previously noted, there can exist certain spin waves (even in the lossless case) having both an $\alpha$ and $k$. The effect of loss on these waves is to modify the $\alpha$ and $k$ values so as to produce attenuation in the direction of energy propagation. Also, the term electromagnetic is, by necessity, used in more than one context herein; an attempt has been made, however, at all times to make clear in what way the term is used. In air the power transfer and energy form of the propagating wave are both electromagnetic, but within the magnetic material described the spin wave power transfer mechanism is exchange and electromagnetic.

In the material the small signal energy density in both the propagating spin wave and the evanescent wave contain the factors shown in the following mathematical analysis:

$$W=\tfrac{1}{2}\epsilon|\bar{e}|^2(\text{electric})+\tfrac{1}{2}\mu_o|\bar{h}|^2(\text{magnetic})$$
$$+\tfrac{1}{2}\mu_o\frac{H_z}{M_z}|m|^2(\text{Zeeman})$$
$$+\tfrac{1}{2}\mu_o\lambda\frac{\partial\bar{m}}{\partial x_j}\cdot\frac{\partial\bar{m}}{\partial x_j}(\text{exchange})+\tfrac{1}{2}\mu_o N_{ij}{}^a m_i m_j$$
$$(\text{magnetic anisotropy})$$

(summation over a repeated subscript is implied), where the terms "electric," etc., in parentheses designate the type of energy represented by the terms immediately preceding the parenthetical term. The elements in the immediately preceding analysis represent the following: $W$ is the small signal (s.s.) energy density (joules/m.$^3$); $e$ is the s.s. electric field (volts/m.); $\epsilon$ is the permittivity of the material, i.e., the permittivity in air ($\epsilon_o\approx1/36\pi\cdot10^{19}$ farads/meter) times the dielectric constant; $\mu_o$ is the permeability of free space ($4\pi\cdot10^{17}$ henries per meter); $h$ is the magnetic field (amperes/m.); $H_z$ is the internal DC magnetic field (amperes/m.); $M_s$ is the saturation magnetization (amperes/m.); $m$ is the s.s. magnetization (amperes/m.); $\lambda$ is the exchange constant (m.$^2$); and $N_i{}^a{}_j=N_i{}^a{}_j$ are dimensionless constants which depend upon orientation of the crystal relative to the internal DC field $H$, the term $N_i{}^a{}_j m_i m_j$ upon expansion taking the form $N_1{}^a{}_1 m_1{}^2+2N_1{}^a{}_2\, m_1 m_2+N_2{}^A{}_2 m^s$, where: $m_1=m_z$, $m_2=m_y$ and $m_3=m_z$.

Further, the s.s. power flux (watts/m.$^2$) is represented by $$(\bar{s})_i=(\bar{e}\times\bar{h})_i-\mu_o\lambda\frac{\partial\bar{m}}{\partial x_i}\cdot\frac{\partial\bar{m}}{\partial t},$$

where: the s.s. power $(s)_i$ = the sum of the small signal power fluxes in the $x$, $y$ and $z$ planes.

The principles discussed herein may be used as a basis for constructing devices in which a magnetic material is placed to couple an input transmission line to a plurality of output transmission lines and to switch output power from one to the other of these outputs as in a strip line or the like, or to provide a microwave computer function such as binary switching. These and other modifications of the invention will occur to those skilled in the art, and all such modifications are considered to fall within the scope of the invention as defined in the appended claims.

What is claimed is:

1. A method as claimed in claim 2 and in which the magnetic bias filed is adjusted and maintained at a value at which the power transfer in the propagating wave is substantially 50 percent in the electromagnetic channel and 50 percent in the mechanical exchange channel.

2. A method of providing switching of electromagnetic microwave energy, that comprises, introducing the electromagnetic wave energy to a magnetic material that will support propagating spin wave energy and in which the electromagnetic wave energy can be converted to propagating spin wave energy, the direction of the group velocity of the spin wave energy in the material being a function of the angle $\psi$ between the $k$ vector of the spin wave and the direction of a DC magnetic bias field within the material, establishing a DC magnetic bias field within the material at a level at which conversion can occur and at an angle to the direction of energy propagation within the material, the level of the internal DC magnetic bias field being such that the wave number of the progating spin wave is substantially greater than $k_o$ but below a wave number at which conversion would occur from spin wave energy to magnetoelastic wave energy, controlling the direction of the internal magnetic bias field to control the direction of said group velocity to enable removal of said wave energy at various regions in the magnetic material along the path of said group velocity, and removing the wave energy in the form of electromagnetic energy from the at least one of said various regions along the path of said group velocity.

3. Apparatus for providing switching of electromagnetic wave energy, that comprises, a magnetic material adapted to receive the electromagnetic energy, the material being one that will support propagating spin wave energy, the material being one in which the electromagnetic wave energy can be converted to propagating spin wave energy and in which the direction of the group velocity of the propagating wave can be varied by varying at least one of magnitude and direction of a magnetic bias field within the material, the material being further adapted to receive an applied magnetic field which is in combination with the magnetic characteristics of the material provides the internal magnetic bias field to effect spatial conversion from electromagnetic power to propagating spin waves, the spin waves being carried in the electromagnetic channel, the quantum mechanical channel or a combination thereof, means for applying a DC saturation magnetic field to the material, means for introducing the electromagnetic wave energy to the material, the applied magnetic field providing an internal magnetic bias field disposed at an angle to the direction of energy propagation within the material, the level of internal magnetic field thereby provided being such that the wave number of the propagating spin wave is substantially greater than $k_o$ but below a wave number at which conversion from spin wave energy to magnetoelastic wave energy could occur, and means for varying the direction of said group velocity to effect switching, said last-named means comprising means for varying at least one of the magnitude and direction of the internal magnetic bias field.

4. Apparatus as claimed in claim 10 and in which input means is provided to present the electromagnetic wave energy to the material at one region thereof and output means is provided to remove electromagnetic wave energy from another region thereof, the output means being located along a path disclosed at an angle to the direction of propagation of the electromagnetic wave into the material.

5. Apparatus as claimed in claim 4 in which the output means is adapted to effect removal of the electromagnetic save energy at a plurality of regions, means being provided to effect changes in the internal magnetic bias field to switch the output from one to the other of said regions.

6. Apparatus as claimed in claim 4 in which the magnetic material is provided with two substantially parallel faces, means associated with one face to reflect the electromagnetic wave energy except at said one region where the electromagnetic energy is admitted to the magnetic material, and further means associated with the other face to prevent exit of wave energy from the magnetic material except at the other region thereof.

7. Apparatus as claimed in claim 6 in which a first metal reflection means is placed between the electromagnetic waves and the magnetic material, a first aperture being provided in the first reflection means at said one region, and a second metal reflection means is provided adjacent said other face, a second aperture being provided in the second reflection means at said other region.

8. Apparatus as claimed in claim 7 in which a plurality of apertures are provided in the second reflection means to effect removal of the electromagnetic wave energy at a plurality of regions, the internal magnetic field being adjusted to effect switching from one to the other of said plurality of apertures.

9. Apparatus as claimed in claim 20 in which the propagation medium is a composite comprising the magnetic material and the first and second reflection means, the first and second reflection means each being a thin film deposited upon the respective faces except at the input and output regions.

UNITED STATES PATENT OFFICE

CERTIFICATE OF CORRECTION

Patent No. 3,609,596 Dated: SEP 28 1971

Frederic R. Morgenthaler

It is certified that error appears in the above-described patent and that said Letters Patent are hereby corrected as shown below:

Column 1, line 12, change "invention" to:--inventor--; and line 66, change "For", to:--for--.

Column 3, line 13, change "X'"to:--x'--; and line 20, change "=ψ" to:--+ψ--.

Column 4, line 19, change "3x10'12" to:--$3x10^{-12}$--; line 21, change "hydromagnetic" to:--gyromagnetic--; line 24, change "$\omega\ \omega_z$" to:--$\omega \approx \omega_z$--;line 27, change "$k**>k_o$" to:--$k>>k_o$--; line 37, after the comma, insert:--β--; and line 69, change "$\bar{r}' = \bar{i}_x' + i_y y' + i_x' z'$" to:--$\bar{r}' = \bar{i}_x' x' + \bar{i}_y' y' + \bar{i}_z' z'$--

Column 5, line 7, change "H" to:--$\bar{H}$--; and line 43, change "($n=k/k_x$ 32 1) to:--($n=k/k_x= 1$)--.

Column 6, line 43, change "$(V_g)$" to:--$(V_g)_\perp$--; and line 55, change "in" to:--is--.

Column 7, line 26, change "k" to:--$k_o$--

Column 9, line 10, after "is", insert:--≈--, and before "will" insert a parenthesis; line 23, change "$10^{13}$" to:--$10^{-3}$--; lines 42 and 43, change "α and k" to:--$\bar{\alpha}$ and $\bar{\kappa}$--; line 69, change "e" to:--$\bar{e}$--; line 71, change "$10^{19}$" to:--$10^{-9}$--; line 72, change "$10^{17}$" to:--$10^{-7}$--; line 73, change "h" to:--$\hbar$--; and line 75, change "m" to:--$\bar{m}$--.

Column 10, line 5, change "$m_1=m_z$, $m_2=m_y$ and $m_3=m_z$" to:--$m_1 \equiv m_x$, $m_2 \equiv m_y$, and $m_3 \equiv m_z$--; and line 10, change "$(s)_i$" to:--$(\bar{s})_i$--.

3,609,596

Column 10, line 60 (claim 3, line 10) cancel "is"; and line 65 (claim 3, line 15), after "mechanical", insert:--exchange--.

Claim 4, line 1, change "10" to:--3--.

Claim 5, line 3, change "save" to:--wave--.

Claim 9, line 1, change "20" to:--7--.

Signed and sealed this 1st day of August 1972.

(SEAL)
Attest:

EDWARD M.FLETCHER,JR.
Attesting Officer

ROBERT GOTTSCHALK
Commissioner of Patents